(12) United States Patent
Fanning et al.

(10) Patent No.: US 10,545,852 B2
(45) Date of Patent: *Jan. 28, 2020

(54) DIAGNOSTICS OF STATE TRANSITIONS

(71) Applicant: Microsoft Technology Licensing, LLC, Redmond, WA (US)

(72) Inventors: Michael C. Fanning, Redmond, WA (US); Felix Gerard Torquil Ifor Andrew, Seattle, WA (US); Daniel J. Moseley, Redmond, WA (US); Simon Calvert, Sammamish, WA (US); Andrew R. Sterland, Bellevue, WA (US); Timothy Rice, Seattle, WA (US); Jeffrey T. Fisher, Redmond, WA (US); Robert A. Paveza, Redmond, WA (US); Taylor C. Woll, Sammamish, WA (US); Gregg Miskelly, Seattle, WA (US); Harold L. Pierson, III, Redmond, WA (US); Christopher Edmonds, Carnation, WA (US); Elliot H. Omiya, Kirkland, WA (US); Karthik Vivek Nadig, Redmond, WA (US); Francisco Javier Wong, Redmond, WA (US); Zhaochuan Gao, Redmond, WA (US); Andriy Stasyuk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,786

(22) Filed: Sep. 18, 2018

(65) Prior Publication Data
US 2019/0057012 A1    Feb. 21, 2019

Related U.S. Application Data

(63) Continuation of application No. 13/801,295, filed on Mar. 13, 2013, now Pat. No. 10,078,575.

(51) Int. Cl.
*G06F 11/36* (2006.01)
(52) U.S. Cl.
CPC .................. *G06F 11/366* (2013.01)
(58) Field of Classification Search
CPC ..................................... G06F 11/366
See application file for complete search history.

(56) References Cited

U.S. PATENT DOCUMENTS 5,655,075 A * 8/1997 Saito ................... H04L 29/06
                                                                   714/48
5,694,539 A * 12/1997 Haley .................. G06F 11/366
                                                                   714/38.1

(Continued)

OTHER PUBLICATIONS

Enikuomehin A. Toyin et al., "Cost Minimization Model For An Adaptive Intrusion Response System", [Online], 2012, pp. 240-248, [Retrieved from Internet on Sep. 4, 2019], <https://www.researchgate.net/profile/Bunmi_Akerele/publication/266341485_Geography/links/5605744508aea25fce333cd5.pdf>.*

*Primary Examiner* — Ziaul A Chowdhury
(74) *Attorney, Agent, or Firm* — Dicke, Billig & Czaja, PLLC (57) ABSTRACT

A method for diagnosing computer readable instructions related to transfers of control is disclosed. A state transition of a unit of execution within a logical operation providing an event handler for a Document Object Model is logged during runtime of the computer readable instructions. Diagnostic information of the logical operation is associated with the state transition. The state transition and associated diagnostic information is provided for retrieval at a selected point in the computer readable instructions.

20 Claims, 4 Drawing Sheets

(56) References Cited

U.S. PATENT DOCUMENTS

| | | | | |
|---|---|---|---|---|
| 5,933,633 A * | 8/1999 | Good | ............... | G01R 31/31835 703/17 |
| 6,009,269 A * | 12/1999 | Burrows | ................. | G06F 9/524 714/38.1 |
| 6,901,055 B1 * | 5/2005 | Hoe | .................... | G06F 17/5045 370/252 |
| 7,107,578 B1 * | 9/2006 | Alpern | ................ | G06F 11/3636 714/E11.207 |
| 7,490,031 B1 * | 2/2009 | Qiu | ........................... | G06F 8/38 703/22 |
| 2003/0101438 A1 * | 5/2003 | Mishra | ...................... | G06F 8/51 717/136 |
| 2005/0183068 A1 * | 8/2005 | Cwalina | .............. | G06F 11/3466 717/128 |
| 2007/0074149 A1 * | 3/2007 | Ognev | ................. | G06F 11/366 717/101 |
| 2007/0113156 A1 * | 5/2007 | Watanabe | ........... | G06F 11/3664 714/766 |
| 2008/0126828 A1 * | 5/2008 | Girouard | ............. | G06F 11/3644 714/2 |
| 2008/0172217 A1 * | 7/2008 | Morizawa | ............... | G06F 11/28 703/13 |
| 2008/0301502 A1 * | 12/2008 | Harsha | .................. | G06F 11/079 714/37 |
| 2009/0049428 A1 * | 2/2009 | Cozmei | ............... | G06F 11/3636 717/128 |
| 2009/0254883 A1 * | 10/2009 | Munson | .............. | G06F 11/3624 717/124 |
| 2010/0235814 A1 * | 9/2010 | Ohta | .................... | G06F 11/3684 717/124 |
| 2012/0109931 A1 * | 5/2012 | Prasad | ................ | G06F 11/3672 707/709 |
| 2013/0290936 A1 * | 10/2013 | Rhee | .................. | G06F 11/3636 717/128 |
| 2014/0304685 A1 * | 10/2014 | Xie | ........................ | G06F 9/455 717/124 |

* cited by examiner

DIAGNOSTICS OF STATE TRANSITIONS

CROSS-REFERENCE TO RELATED APPLICATIONS

This patent application is a continuation of Ser. No. 13/801,295 filed Mar. 13, 2013, entitled "DIAGNOSTICS OF STATE TRANSITIONS," which is incorporated herein by reference.

BACKGROUND

Program debugging, or debugging, is a methodical process of finding and reducing the number of bugs, or defects, in a computer program or a piece of electronic hardware to make the computer program behave as expected. Debugging in general is a lengthy, tiresome task, and programmers often use a software tool such as a debugger operating on a debuggee process to monitor execution of the computer program and to perform program debugging. During investigation of the program, the programmer may stop the execution of the debuggee process, collect data values, or otherwise affect the execution of the debuggee process based on the values of the variables.

Debugging technologies often struggle to keep up with improvements in development technologies. Software development technologies have advanced to provide many developers with additional tools to readily create programs with rich user experiences adapted for multiple platforms and systems with customization for selected user groups in ways once only available to the most advanced developers. Many of these development technologies have made traditional debugging processes more difficult for a number of reasons. Thus, software developers are often caught in a conundrum of whether to implement new software utilizing development technologies that entail significant debugging costs and potentially compromise the ability to quickly bring products to consumers.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Debugging or troubleshooting code is difficult in cases where the origin of the piece of code in which a break occurs is not known at the time the problem actually occurs during execution. This information is typically no longer available for retrieval and inspection, and often has been popped from a call stack because of the nature of asynchronous programming, in which a routine responsible for doing long-running work is running concurrently and separately from a routine or work that started the long-running work. In some examples, such as in applications involving multiple threads, the relevant information may be available on the stack but is difficult to locate across a specific subset of many available threads. Additionally, while this information may exist, the sequence and timing relating the pieces of information may be missing.

This disclosure includes a method to associate diagnostics information regarding the origin of runtime artifacts in which runtime issues tend to be manifested at later times. Example artifacts include callbacks, event handlers for inserted Document Object Model (DOM) elements, and other examples of transfers of control. In one example, a state transition of a unit of execution within a logical operation, such as an asynchronous operation, is logged during runtime of computer readable instructions. Diagnostic information, such as a call stack frame, is associated with the logical operation. The logged state transition and associated diagnostic information are provided for retrieval at a selected point, such as at a break point or when an exception is thrown. Asynchronous operations are used for illustration, but the examples can be applied to other transfers of control.

Developers can consult the diagnostic information when conducting standard troubleshooting operations against those targets such as hitting a breakpoint in an impacted callback or inspecting a DOM element that is in an incorrect state. The diagnostic information can be used to perform standard debug and troubleshooting operations, such as jump-to-code, in order to troubleshoot the originating code that represents the root cause of a problem. Call stack locations for all object constructions might be collected as well in order to assist with memory profiling, assisting in debugging memory leaks, and the like.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
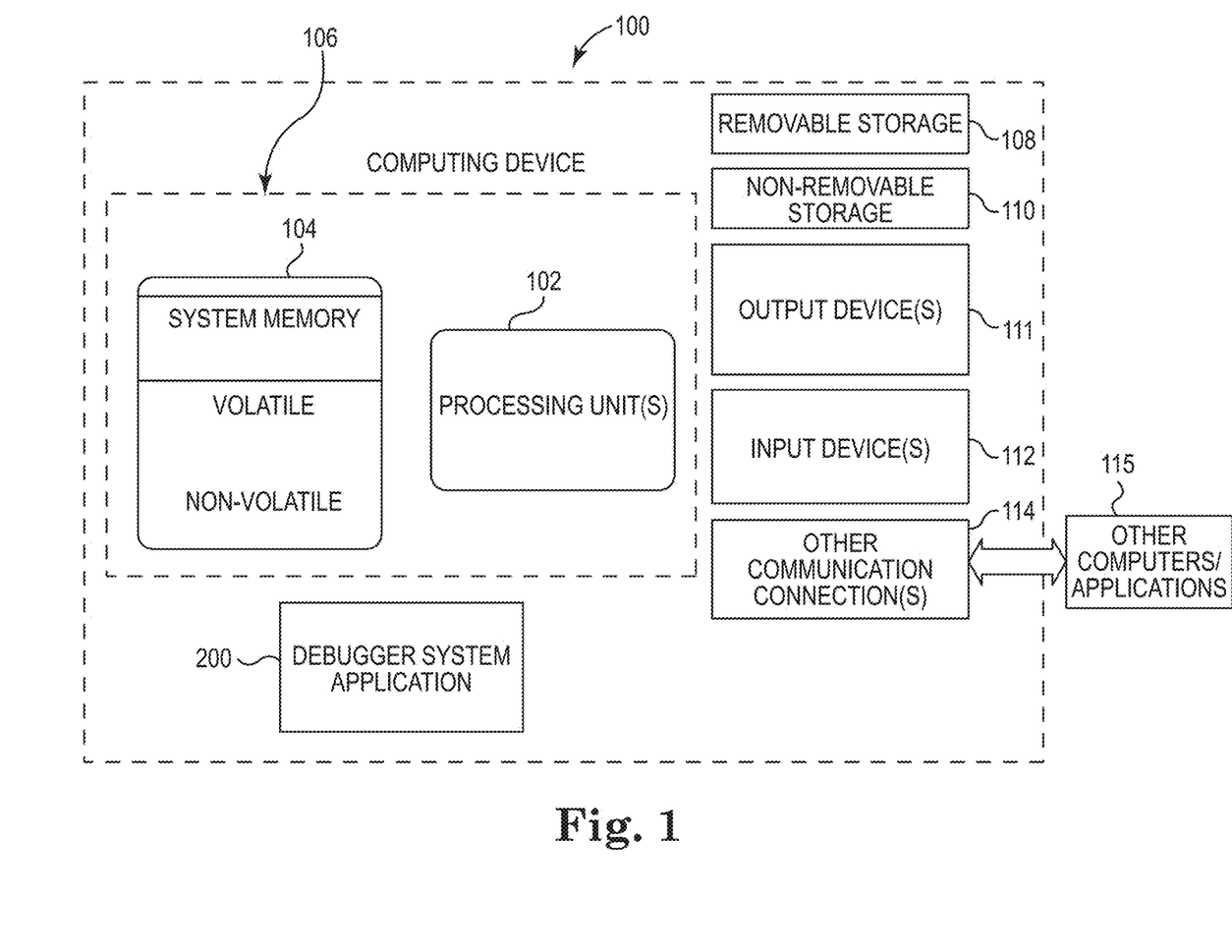
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process to associate diagnostic information along with state transitions an application. The computer system can also be used to develop and/or run computer applications having processes to evaluate the diagnosis information retrieved from runtime of the application.

The exemplary computer system includes a computing device, such as computing device 100. In a basic hardware configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

Some embodiments of the computing device 100 include a call stack. A call stack is a stack data structure constructed in memory 104 that stores information about the active subroutines of a running computer program. This kind of stack is also known as an execution stack, control stack, run-time stack, machine stack, or just "the stack." A call stack is used for several related purposes, and one is to keep track of the point to which each active subroutine returns control when it finishes executing. An active subroutine is one that has been called but is yet to complete execution after which control is handed back to the point of call. Such activations of subroutines may be nested to any level, hence the stack structure. The caller pushes the return address onto the stack. The called subroutine, when it finishes, pops the return address off the call stack and transfers control to that address. If a called subroutine calls on to another subroutine, another return address is pushed onto the call stack, and so on, with the information stacking up and un-stacking as the program dictates. One call stack is often associated with a running program or with each task or thread of a process, although additional stacks may be created for signal handling or cooperative multitasking. Developers often use the call stack to determine code locations and origins. Asynchronous and event driven paradigms, however, drastically reduce the ability to orient via the call stack.

Computer applications often call methods to perform an operation outside of the main application. Examples include accessing a resource, offloading a difficult computation, and reading files from storage. Generally, the approaches used to perform the methods include synchronous operations and asynchronous operations. Synchronous operations generally stall execution of main application while the method performs the task. Stalling the application runs the risk of holding onto valuable computing resources, such as a user interface (UI) rendering thread, while the synchronous operation completes. The main application is resumed after the method returns a result. Asynchronous operations, in contrast, allow the application to continue to perform work while the method performs the task. Asynchronous operations are preferred over synchronous operations whenever the application calls a method that will wait a non-deterministically and relatively long time, such as accessing resources on a computer network.

Developers have found asynchronous programming models to be difficult to understand or implement as compared to the commonly used and relatively straightforward synchronous programming model. Developers struggle with reasoning about asynchronous work, because it completes in parallel. Whereas a developer writing synchronous code can easily reason about serial state transitions, asynchronous operations may handle the transitions concurrently. Transitions in asynchronous operations may happen synchronously or asynchronously, and results of these state transitions may impact later state transitions, which means that developers need better tools to reason about this type of programming approach. This is particularly true due to an ongoing trend to provide more features to facilitate asynchronous programming in popular languages, frameworks, and runtimes. Examples include the Microsoft Windows Library for JavaScript Promise class, the async and await keywords introduced into the C# language in version 5.0, as well as the Await and Async keywords introduced in Microsoft Visual Basic .NET 11.

Debugging or troubleshooting code is difficult in cases where the origin of the piece of code in which a break occurs is not known at the time the problem actually occurs during execution. One example includes a transfer of control such as a callback. A callback is a reference to a piece of executable code that is passed as an argument to other code. This allows a lower-level software layer to call a subroutine, or function, defined in a higher-level layer. Asynchronous programming in modern programming languages is often implemented with callbacks, and an asynchronous callback that is associated with many different events or threads might be executed with an invalid parameter that originates with a specific event or thread usage. When a related exception is thrown (due to, e.g., dereferencing a null parameter), the code that originally packaged the problematic parameter is typically no longer available on the stack for inspection. This problem is a typical one for both strongly and weakly typed languages as well as for one or both statically and dynamic typed languages where event-driven Application Program Interfaces (APIs) are commonly available, as are thread pools, web workers, and the like.

In addition to problems presented in asynchronous transfers of control, JavaScript as executed in a web browser is particularly prone to a specific set of related problems of transfer of control. Debugging web page Document Object Model (DOM) elements can be difficult, for example, because there is often no available information related to the origin of specific elements in a page (as those elements may be dynamically constructed by any of a number of mechanisms at runtime, rather than uniformly described in static HTML code). These origin details may be essential to debugging certain classes of problem (such as diagnosing a memory leak, where it is important to determine what code is responsible for constructing and/or injecting page objects which are not being properly cleaned up). DOM is a cross-platform and language-independent convention for representing and interacting with objects in markup language (e.g., HTML, XHTML and XML) documents. Objects in a DOM tree may be addressed and manipulated by using methods on the objects, and the public interface of a DOM is specified in its API. It is not feasible for a developer to set a breakpoint in code that will halt on every construction of a specific element type. In many runtime environments, it may not be feasible to set a break point whenever a specific kind of element is added to the DOM. More recent browser environments support DOM mutation events including a rich set of callbacks invoked for every kind of alteration to the DOM. These events, however, may not be a preferred or effective (performant) way to debug a specific issue, and no browser diagnostic toolset currently exposes a general way to track object origin using this mechanism in order to debug or troubleshoot issues.

Figure 2:
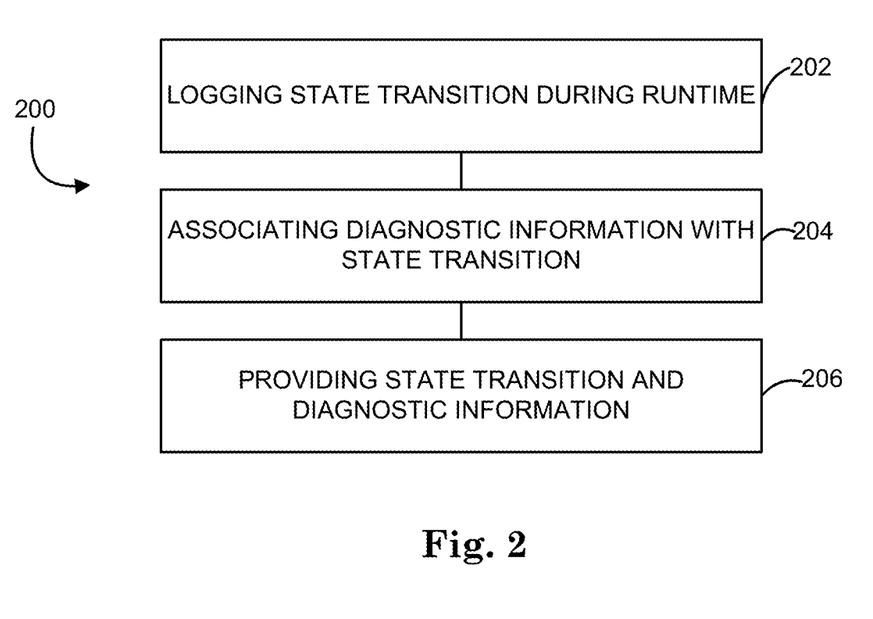
FIG. 2 is a block diagram of a method for diagnosing state transitions that can be configured to run on a computing device of FIG. 1.

FIG. 2 illustrates a method 200 for addressing the challenges presented in diagnosing runtime artifacts where there is a transfer of execution control in the application such as constructing an object, initiating a callback, scheduling a parameterized worker thread, using state and event handlers associated with DOM elements, and the like.

Some examples of points in code leading to a transfer of execution control include associating a callback, or constructing an object. A common callback might be associated with many originators. Callbacks can also be associated with such asynchronous operations as events, XMLHttpRequest (XHR) requests, thread pool requests, and others. On receiving a callback, the stack may no longer contain information regarding the code location from which the callback and its associated parameters originated. This information, however, is often used to resolve a break such as to fix parameter construction logic. In another example, breakpoints can be set in strongly typed languages including an explicit constructor in order to halt on construction of an object instance. This is not always possible in a dynamic language because there are no source code locations that represent constructors for DOM-provided types. For example, a developer cannot set a breakpoint on constructing any canvas element. Some objects such as function definitions might originate with a call to 'eval' or one of several other dynamic code generation APIs that are available in JavaScript/DOM, such as setTimeout, setInterval, Function( ), execScript, and the like.

In web applications, many issues occur due to problems with state or event handlers associated with DOM elements. It is often helpful in these cases to know the source code location where a relevant DOM element was inserted into the document. As noted above, this information, however, is commonly not available at runtime for all objects. DOM elements and other runtime objects in HTML/JavaScript applications can originate with a broad array of APIs, createElement, setInnerHtml, document.write, eval, and the like.

Method 200 associates diagnostic information regarding the origin of runtime artifacts in which runtime issues tend to be manifested at later times. Diagnostic information can include source code location, such as a stack frame and other diagnostic information. Developers can consult this information when conducting standard diagnostics operations against those targets such as hitting a breakpoint in an impacted callback or inspecting a DOM element that is in an incorrect state. The diagnostic information can be used to perform standard debug and troubleshooting operations, such as jump-to-code, in order to troubleshoot the originating code that represents the root cause of a problem. Call stack locations for all object constructions might be collected as well in order to assist with memory profiling, assisting in debugging memory leaks, and the like.

In method 200, a state transition of a unit of execution within a logical operation is logged during runtime of computer readable instructions at 202. An example state transition includes creating a unit of operation. In one example, the logical operation can include an asynchronous operation and the unit of execution can include the synchronous work item. In this example, an asynchronous operation is an abstraction of asynchronous work. An asynchronous operation creates one or more synchronous work items and can be related to zero or more work items besides its creator. A synchronous work item is an abstraction for a synchronous piece of work. Synchronous work items are associated with the asynchronous operation that created them. A synchronous work item may create zero or more additional asynchronous operations. Asynchronous operations are used for illustration, but the examples can be applied to other transfers of control. Diagnostic information, such as a call stack frame and other information, is associated with the logical operation at 204. The logged state transition and associated diagnostic information are provided for retrieval at a selected point at 206, such as at a break point or when an exception is thrown.

The state transition can be logged into a persistent storage location at 202, such as into a data structure created in memory 104. Logging can include broadcasting the state transition by publishing events or invoking callbacks registered for notification and annotating runtime objects with relevant information, which can include state transitions or other diagnostic details. For example, on constructing an object in a dynamic language, relevant information can be added directly to the object instance. On creating an object, information can be pushed into the object to carry that information. Logging can further include replacing runtime objects or classes with wrappers that process or raise notifications and maintain relevant information in the data structures.

As described, diagnostic information can include information related to the call stack associated with the state transition. Additionally, the diagnostic information can include a timestamp associated with the state transition. Further, the diagnostic information can include various identifiers that can be used to identify the asynchronous operation during lifetime of the asynchronous operation. Examples of such identifiers can include execution context identifiers that can assist in tracking synchronous sub-units of work, a process identifier, an actual thread identifier, an operation identifier, a platform identifier, an identifier for the logic unit of work, a parent identifier, and information identifying the current processor 102 or computing device 100. One type of identifier can include a logical thread identifier in Component Object Model (COM) technologies used by operating systems in communicating with operating systems such as those available under the trade designation Windows available from Microsoft, Inc. In some examples, the identifier can be presented as a multi-bit (64 bit, 128 bit, etc,) identifier such as a universally unique identifier (UUID). In other examples, the identifier may be presented as text, comments or other developer-friendly indicia.

Other diagnostic information can include a Universal Resource Locator (URL) associated with an XHR request, for example, that might flow to a callback that is executed when the request completes. This information can be used during debugging in order to determine whether the original URL request was via an insecure protocol and therefore subject to tampering.

In one example, stack information is provided for any dynamically constructed code, i.e., when hitting a breakpoint in code that was produced by a call to eval or one of its functional equivalents, it would be helpful to know the stack that was current when the code was dynamically constructed, such as by a call to eval, setTimeout, or other. Another example associates a stack with code locations that inject into the DOM. A call to an innerHTML setter, for example, might result in construction of arbitrary DOM elements including script elements or bits of debuggable JavaScript associated with an element, e.g., a mouseover handler. The asynchronous operation here is the construction of a set of DOM elements and event handlers as well as any actual calls to those handlers. Hitting a breakpoint in one synchronous work item, e.g., the mouseover callback, can provide access to stack information associated with a separate synchronous work item, such as the code location where innerHTML or some other DOM injection mechanism, appendChild, and others, was originally called.

Method 200 can be implemented as a tool to be run on the computing device 100. In one example, the tool is a software program or part of a software package such as the operating system or a managed environment in circumstances where a managed environment is applicable. The software program can be included in a computer readable storage medium storing computer executable instructions for controlling a computing device, such as computing device 100, to perform the method 200.

Method 200 describes a mechanism for constructing and maintaining a graph including nodes and edges that represent the execution and progress of some logical operation such as, for example, an asynchronous operation. The graph organizes execution that occurs in a variety of contexts, across threads, processes, and the like. Individual nodes, or sub-units of execution, might still be in progress, already complete, or scheduled but not yet executed. The system tracks state transitions of constituent nodes, associates arbitrary diagnostics-related information with the nodes, and provides edge and other information sufficient to maintain an accurate graph over time. A debugger or other diagnostics tool can consume the information by using a currently available node, such as one that is associated with the current code location where a debugger is halted, in order to traverse the graph to compute or retrieve state and other diagnostics information of in-progress or already completed work that is relevant to understanding the current code execution context.

In an example of asynchronous causality modeling illustrated in the code below: btn_OnClick( ) function is called when the user clicks on the button. This creates a promise where some long running task is done where setTimeout is used. (A promise, which is sometimes used interchangeably as a "future" or a "delay," refers to constructs used for synchronizing in some concurrent languages and describes an object that acts as a proxy for a result that is initially unknown, usually because the computation of its value is yet incomplete.) After finishing the work, it fires the completion handler wherein the function OpenAndWriteToFiles is called that asynchronously creates and writes to two files. It then joins the promise for the two asynchronous write operations. Upon completion of both asynchronous operations the code reaches the message "Finished writing to all files".

```
function btn_OnClick( ) {
    (new WinJS.Promise(function (complete, error,
progress) {
        setTimeout(fuction ( ) {
            complete( );
        }, 1000);
    })).then(function ( ) {
        OpenAndWriteToFiles( );
    });
}
function OpenAndWriteToFiles( ) {
    var async1 =
Windows.Storage.KnownFolders.documentsLibrary.createFile
Async(
        "file1.txt",
Windows.Storage.CreationCollisionOption.replaceExisting
        );
    var async2 =
Windows.Storage.KnownFolders.documentsLibrary.createFile
Aync(
        "file2.txt",
Windows.Storage.CreationCollisionOption.replaceExisting
        );
    WinJS.Promise.join([async1, async2])
        .then(function ( ) {
            DoSomething("Finished writing to all
files");
        });
}
```

The example illustrates management of the graph in that it describes a join operation managing completion of two distinct asynchronous operations. Management operations around a graph, such as adding or removing nodes, constructing edges, or other pruning operations, relate to a unit of work or activity. An operation that includes several distinct units of asynchronous work might halt unexpectedly due to a cancelation. The graph/execute state can be altered on the basis of a state transition in one of a set of triggers.

In the context of the graph, diagnostic information can include a global identifier for the logical operation. Other identifiers in this context can include a thread identifier, an identifier of the operation, an identifier of the state transition, an identifier of the current node, an identifier of the parent node, an identifier to construct edges between graph nodes, and/or information reporting the current state to which the node is transitioning.

Program debugging, or debugging, is a methodical process of finding and reducing the number of bugs, or defects, in a computer program or a piece of electronic hardware to make the computer program behave as expected. Debugging in general is a lengthy, tiresome task, and programmers often use a software tool such as a debugger operating on a debuggee process to monitor execution of the computer program and to perform program debugging. During investigation of the program, the programmer may stop the execution of the debuggee process, collect data values, or otherwise affect the execution of the debuggee process based on the values of the variables. Debugging is often performed prior to deployment of a program as part of quality assurance, but end users also can discover bugs during use of the program. If a program crashes during use of the program by an end user, an operating system can collect information regarding the crash and provide the information over a network connection to the developer as a crash dump.

Figure 3:
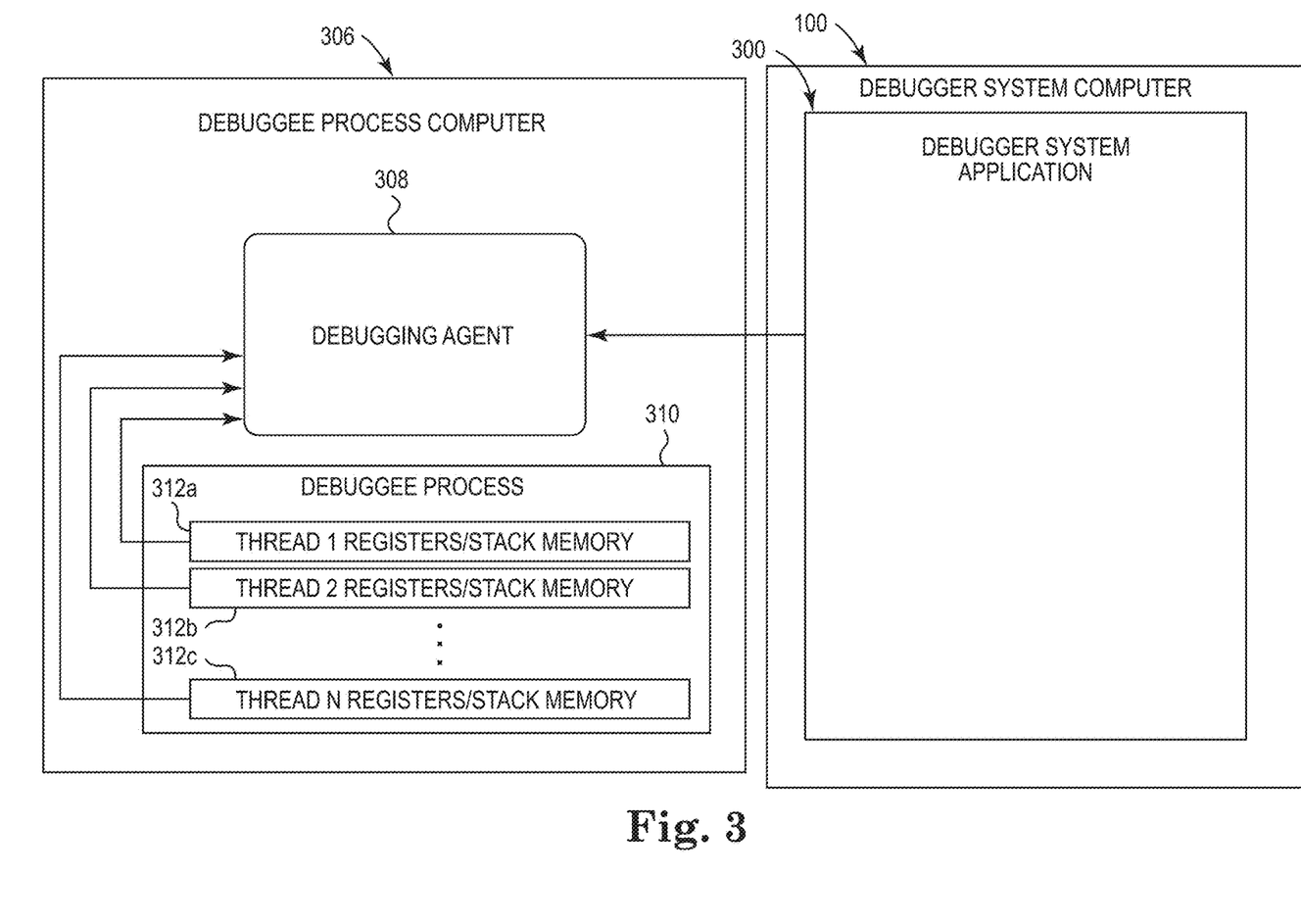
FIG. 3 is a block diagram illustrating an example of a diagnostic tool configured to run on one or more computing devices of FIG. 1.

FIG. 3 illustrates an example diagnostic tool configured to run on the computing device 100. In one implementation, computing device 100 includes a debugger system application 300. One embodiment of a debugger system computer 100 (e.g., computing device 100 illustrated in FIG. 1) comprising a debugger system application 300 interfacing with a debuggee process computer 306 (e.g., a computing device similar to computing device 100 illustrated in FIG. 1) comprising a debugging agent 308 and a debuggee process 310 is illustrated in FIG. 2.

Debugger system application 300, debugging agent 308, and debuggee process 310 can be implemented on any suitable type and suitable number of computer systems, such as computing device 100 illustrated in FIG. 1. In one embodiment, debugger system application 300 is one of the application programs that reside on computing device 100, debugging agent 308 is one of the application programs that reside on debuggee process computer 306, and debuggee process 310 is one of the application programs that reside on debuggee process computer 306. Debugger system application 300, however, can alternatively or additionally be embodied as computer executable instructions on one or more computers and/or in different variations than illustrated in FIG. 1. Alternatively or additionally, one or more parts of debugger system application 300 can be stored in system memory 104, on other computers/applications 115, or other such suitable variations for running a debugger system application.

In one embodiment, debugging agent 308 is on a debuggee process computer 306 that is remote from debugger system computer 100 that includes debugger system application 300. In other embodiments, however, debugging agent 308 and/or debuggee process 310 resides on the same computer as debugger system application 300. The debugger system application is configured to request a current call stack of multiple threads of debuggee process 310. In the embodiment illustrated in FIG. 3, debuggee process 310 includes threads 1, 2, . . . N which correspondingly have thread registers and stack memory indicated at 312a, 312b, . . . 312c.

Embodiments of debugger system application 300, debugging agent 308, and debuggee process 310 are described in the general context of computer-executable instructions, such as program modules, being executed by a computer. Generally, program modules include routines, programs, objects, components, data structures, etc. that perform particular tasks or implement particular abstract data types. Embodiments may be practiced in distributing computing environments where tasks are performed by remote processing devices that are linked through a communications network. In a distributed computer environment, program modules may be located in both local and remote computer storage media including media storage devices.

In one example, the debugger system application 300 can be a part of an integrated development environment, or IDE. The IDE can include a code editor, a compiler, build tools, a debugger and other tools for developing and testing an application. An example of an IDE is available under the trade designation "Visual Studio" from Microsoft or under the trade designation "Xcode" from Apple, Inc., of Cupertino, Calif. U.S.A. The debugger system application 300 can also be a separate product that can be used with one or more IDE packages or as a stand-alone product.

Figure 4:
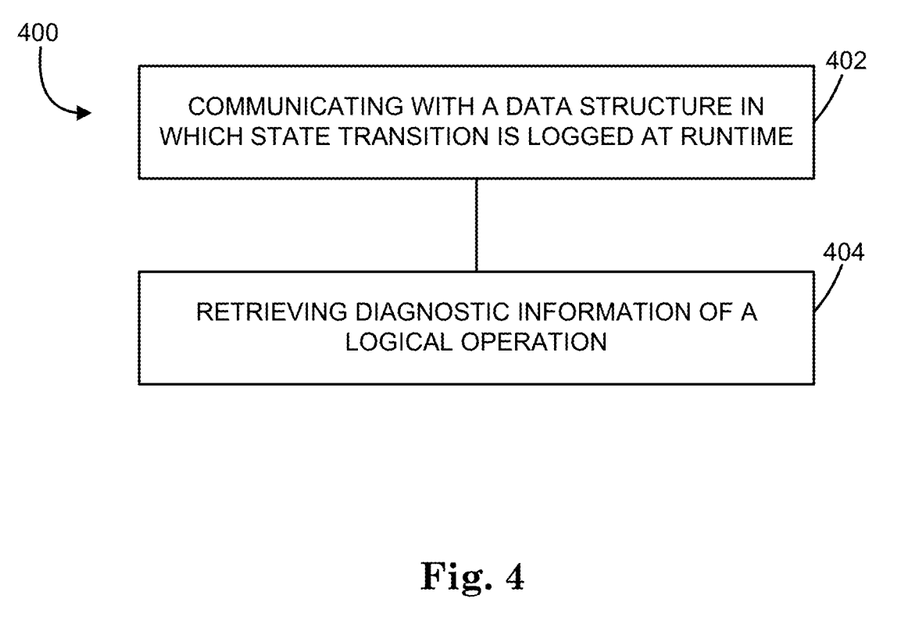
FIG. 4 is a block diagram of a method for diagnosing state transitions that can be configured to run on a computing device of FIG. 1.

FIG. 4 illustrates a method 400 for use with the debugger system application or other software diagnostic tool to troubleshoot or debug an application where runtime artifacts are manifested at later times. Diagnostic information is associated with a state transition of a unit of execution within a logical operation logged during the runtime of the application at 402. In one example, the state transition and diagnostic information is logged in a data structure. The debugger or diagnostic retrieves the diagnostic information and state transition at a selected point at 404. In one example, the diagnostic information associated with the state transition is retrieved from the data structure in memory. This diagnostic information associated with the state transition can be retrieved during runtime, such as while the application is executing. In some example, the application can be halted and information retrieved at an exception or breakpoint in the execution. Also, the diagnostic information associated with the state transition can be retrieved from a crash dump.

Example code for logging a state transition of a unit of execution within a logical operation during runtime of the computer readable instructions and associating diagnostic information of the logical operation with the state transition is provided for a JavaScript model as:

```
var Harpoon;
(function (Harpoon) {
    'use strict';
    var originalSetTimeout = window.setTimeout;
    var originalSetInterval = window.setInterval;
        var originalAttachEvent = window.attachEvent;
        if ((window).addEventListener) {
            var originalAddEventListener = window.addEventListener;
        }
        if ((window).setImmediate) {
            var originalSetImmediate = (window).setImmediate;
        }
        var originalXHR = (window).XMLHttpRequest;
        var activeStack = [ ];
        function trim(str) {
            return str.replace(/^\s\s*/, '').replace(/\s\s*$/, '');
        }
        function getCallstack( ) {
            try {
                throw new Error( );
            } catch (e) {
                if (e.stack) {
                    var stack = e.stack.split('/n');
                    stack = stack.slice(3);
                    stack = stack.map(trim);
                    return stack.join('/n');
                }
                // No stack support
                return null;
            }
        }
        function pushActiveStack(newStack, currentCallstack)
        {
            activeStack = newStack;
            activeStack.push(currentCallstack);
            return function( ) {
                // since we are reusing the array that is passed in,
                // we must restore it to a clean state
                activeStack.pop( );
                activeStack = [ ];
            }
        }
        function debuggableAttachEvent(type, callback) {
            var callbackWrapper = callback;
            if (type == "onmessage")
            {
                var callstack = getCallstack( );
                var savedStack = activeStack.slice(0);
                callbackWrapper = function(evt) {
                    var restore =
pushActiveStack(savedStack, callstack);
                    callback(evt);
                    restore( );
                };
            }
            return originalAttachEvent(type,
callbackWrapper);
        }
        function debuggableAddEventListener(type, callback, capture) {
            var callbackWrapper = callback;
            if (type == "message")
            {
                var callstack = getCallstack( );
                var savedStack = activeStack.slice(0);
                callbackWrapper = function(evt) {
                    var restore =
pushActiveStack(savedStack, callstack);
                    callback(evt);
                    restore( );
                };
            }
            return originalAddEventListener(type,
callbackWrapper, capture);
        }
        function debuggableSetTimeout(callback, delay) {
            var callstack = getCallstack( );
            var savedStack = activeStack.slice(0);
            return originalSetTimeout(function( ) {
                var restore = pushActiveStack(savedStack, callstack);
                callback( );
                restore( );
            }, delay);
        }
        function debuggableSetInterval(callback, delay) {
            var callstack = getCallstack( );
            var savedStack = activeStack.slice(0);
            return originalSetInterval(function( ) {
                var restore = pushActiveStack(savedStack, callstack);
                callback( );
                restore( );
            }, delay);
        }
        function debuggableSetImmediate(callback) {
            var callstack = getCallstack( );
            var savedStack = activeStack.slice(0);
            return originalSetImmediate(function( ) {
                var restore = pushActiveStack(savedStack, callstack);
                callback( );
                restore( );
            });
        }
        // because Object.getOwnPropertyNames doesn't work on an XMLHttpRequest object
        function enumerateProperties(obj) {
            var props = [ ];
            for(var key in obj) {
                props.push(key);
            }
            return props;
        }
        var DebuggableXMLHttpRequest = (function ( ) {
            function DebuggableXMLHttpRequest( ) {
                var originalCallbacks = {
                };
                var xhr = new originalXHR( );
                var properties =
enumerateProperties(xhr).reduce(function(descriptors, prop) {
                    if(prop.toLowerCase( ).indexOf('on') === 0) {
                        descriptors[prop] = {
                            get: function( ) {
                                return
originalCallbacks[prop];
```

-continued

```
        },
        set: function(value) {
            originalCallbacks[prop] = value;
            var callstack = getCallstack( );
            var savedStack = activeStack.slice(0);
            xhr[prop] = function( ) {
                var restore = pushActiveStack(savedStack, callstack);
                value.apply(xhr, arguments);
                restore( );
            };
        }
    };
} else {
    descriptors[prop] = {
        get: function( ) {
            var value = xhr[prop];
            if(typeof (value) === 'function') {
                return function( ) {
                    value.apply(xhr, arguments);
                }
            } else {
                return value;
            }
        },
        set: function(value) {
            xhr[prop] = value;
        }
    };
}
            return descriptors;
        }, {
        });
        Object.defineProperties(this, properties);
    }
    return DebuggableXMLHttpRequest;
})( );
Harpoon. DebuggableXMLHttpRequest = DebuggableXMLHttpRequest;
(DebuggableXMLHttpRequest.prototype).LOADING = originalXHR.LOADING;
(DebuggableXMLHttpRequest.prototype).DONE = originalXHR.DONE;
(DebuggableXMLHttpRequest.prototype).UNSENT = originalXHR.UNSENT;
(DebuggableXMLHttpRequest.prototype).OPENED = originalXHR.OPENED;
(DebuggableXMLHttpRequest.prototype).HEADERS_RECEIVED = originalXHR.HEADERS_RECEIVED;
    function getTrace( ) {
        return activeStack;
    }
    Harpoon.getTrace = getTrace;
    function enable( ) {
        if (!getCallstack( ))
            return;
        window.setTimeout = debuggableSetTimeout;
        window.setInterval = debuggableSetInterval;
        (window).XMLHttpRequest = DebuggableXMLHttpRequest;
        window.attachEvent = debuggableAttachEvent;
        if((window).addEventListener) {
            (window).addEventListener = debuggableAddEventListener;
        }
        if((window).setImmediate) {
            (window).setImmediate = debuggableSetImmediate;
        }
    }
    Harpoon.enable = enable;
    function disable( ) {
        if (!getCallstack( ))
            return;
        window.setTimeout = originalSetTimeout;
        window.setInterval = originalSetInterval;
        (window).XMLHttpRequest = originalXHR;
        window. attachEvent = originalAttachEvent;
        if((window).addEventListener) {
            (window).addEventListener = originalAddEventListener;
        }
        if((window).setImmediate) {
            (window).setImmediate = originalSetImmediate;
        }
    }
    Harpoon.disable = disable;
})(Harpoon||(Harpoon={ }));
```

The following example Javascript code illustrates a single transfer of control associating the asynchronous opening of a file to code that executes when the open is complete. This example demonstrates a method chaining, or fluent interface, pattern programming model.

```
file.openAsync(FileAccessMode.read)
    .done(function(stream) {
        //code to process stream omitted
    })
```

The example starts with an ambient work item, i.e. whatever the work item is executing is when the example code executes. A StorageFile object is stored in the variable named "file". The first line of code is a call to the file's OpenAsync function, which is an asynchronous function and is associated with the ambient work item. The OpenAsync function creates a single work item, which is the completion handler. The completion handler work item is associated back to the ambient work item via the OpenAsync job. This connection ties the causality of the work executed in the completion handler back to the ambient work item.

In the completion handler work item, it is possible to create another asynchronous work item operation can be created from the completion handler work item. For example, the example code above can be modified to add stream data processing via a DataReader.

```
file.openAsync(FileAccessMode.read)
    .done(function(stream) {
        var reader = new DataReader(stream);
        reader.loadAsync(size)
            .done(function(count) {
                //process file data with reader
                reader.close( );
            });
    });
```

The modified example code introduces a second asynchronous call, i.e., reader.LoadAsync, in the completion handler for OpenAsync. The second asynchronous operation is a job that is associated with the work item in which it was created, which in the example is in the OpenAsync completion handler work item rather than the ambient work item. The asynchronous operation creates a single completion handler work item that will process the data from the stream and finally close the DataReader. Accordingly, the example provides a series of three work items tied together with asynchronous operation jobs.

Many asynchronous jobs exclusively perform callee-specified work. For example, the StorageFile.OpenFile function is implemented by the StorageFile object. From the perspective of the caller, the scheduled work is an implementation detail of the implementation of the StorageFile object. This is referred to as an "internal" causality work item as the scheduled work is internal to the implementation of the job.

In contrast, some asynchronous jobs perform caller-specified work. One example is ThreadPool.RunAsync, which takes a caller-provided delegate. The ThreadPool RunAsync job schedules work on a ThreadPool thread to execute the provided delegate. The scheduled work is external to the implementation of the job. Other examples of jobs with external causality work items include CoreDispatcher.RunAsync, CLR's Task.Run and JavaScript's Web Workers. For jobs with internal causality work items, the start and complete states of the job relate into a single causality. For jobs with external work items, both the external work and the complete handler of the job relate back to the initial work item in a single causality.

The following example code in C# involves the use of thread pools.

```
//Point 1
ThreadPool.RunAsync(( ) => {
   //Point 2
   Dispatcher.RunAsync(CoreDispatcherPriority.Normal, ( )
=> {
      //Point 3
   }
});
```

The code schedules work to be done using a thread pool thread via ThreadPool.RunAsync. The thread pool work schedules work to be done on a user interface (UI) thread via CoreDispatcher.RunAsync, which is available as the Dispatcher property on objects that inherit from DependencyObject in Microsoft Windows Presentation Framework or Windows Store applications.

The second and third points indicated with comments in the code will be on separate threads. In particular, point 2 will be on a thread pool thread and point 3 will be on the UI thread. The thread of the first point is dependent on omitted code, but for the purposes of the example the code is on the UI thread. Jobs are related with external causality work items so the causality chain for point 3 connect back to point 2 which in turn point back to point 1 even though points 1 and 3 are on a different thread than point 2.

Multiple threads present additional difficulties in determining relevant information for debugging. A prominent issue in JavaScript, a single-threaded execution environment, is the lack of relevant stack information. In debugging scenarios related to multi-threaded execution environments, such as legacy managed desktop application, the relevant stack information might be available but difficult to locate. In an example, the primary UI thread of a managed application schedules three asynchronous operations by creating several threads, associating them with a callback and a synchronization object. Execution freezes. Upon examination, execution is stalled on the UI thread, where the work is scheduled in this example, on a method such as WaitHandle.WaitAll(events). One or more of the events passed to this method has not been signaled. There could be dozens of threads viewable in the debugger, and it may not be clear which of them are participating in the relevant logical execution sequence and which are not. Using information generated by this application, the IDE could filter out any threads that are not relevant to the execution graph associated with the selected thread. Furthermore, the IDE could maintain historical information on thread operations associated with the current 'wait' that have already completed.

For example, the code below initiates three threads that will, once started, invoke three distinct callbacks. For illustrative purposes, the callbacks have been labeled to describe the behavior assumed for each; one hangs, one completes immediately, and one throws an exception (meaning the thread will die). If this code is run with a breakpoint set on WaitHandle.WaitAll, the debugger will show all possible threads. For this chain of execution, two relevant threads will remain in memory: the thread that is calling WaitAll and the thread that has hung. The other two threads, with entirely different results, are gone, i.e., the thread that has succeeded and the thread that raised an unhandled exception. The disclosed methods allow a user to track the entire operation as a single unit of logical execution.

In the following example, an initiating thread initiated the following and is waiting on the join of these operations. The started HangCallback thread is still in progress, the started CompleteWork thread has terminated successfully, and the started ThrowException thread has terminated with error.

```
static ManualResetEvent[ ] events;
static void InitiateParallelWork( ){
   events = new ManualResetEvent[3];
   for (int i = 0; i < events.Length; i++)
   {
      events[i] = new ManualResetEvent(false);
   }
   new Thread (new ThreadStart(HangCallback)).Start( );
   new Thread (new
ThreadStart(CompleteWorkCallback)).Start( );
   new Thread (new
ThreadStart(ThrowExceptionCallback)).Start( );
   WaitHandle.WaitAll(events);
}
```

The following example illustrates a simple use of an asynchronous coding pattern introduced in C#5.0 which utilizes the 'async' and 'await' keywords to assist in the coordination and execution of asynchronous code. The code example illustrates the information gap (e.g., missing relevant callstack details) described above.

```
static void InitiateAsynchronousWork( ){
   OperationAsync( ).Wait( );
}
async static Task OperationAsync( )
{
   await Task.Delay(1000);
   // If a user sets a breakpoint here, it would be
   // helpful to understand that
   InitiateAsynchronousWork
   // is that cause or origin of this execution.
}
```

In the following example, a custom attribute is defined that can be applied to an arbitrary code location. The custom attribute causes this method to effectively get wrapped in a manner that produces an appropriate set of state transitions at runtime. Implied code can be generated at compile time and emitted to the assembly or relevant code can be injected at runtime. The additional code can be conditionally emitted. For example, the broadcasting might only occur for debug builds or if execution is initiated as part of a debugging session. In other examples, other suitable forms of expression, other than a custom attribute, are employed, such as a new language keyword or a change in a compilation behavior of an existing language keyword. Some of the diagnostic state might automatically be provided (e.g., an over-arching identifier, a parent identifier that might be active, a thread identifier, a callstack, or a timestamp associated with a point of execution). Other arbitrary data associated with a specific application of metadata might also be provided. This example effectively describes a generic annotation scheme for applying a pattern that could also be made explicit via direct calls to an API.

```
[BroadcastTransition(customData = "xxx")]
void CompleteAsynchronousOperation( )
{
    // ...
}
```

The following example illustrates an example code pattern as well as example code a runtime or a compiler emits/executes if a metadata/keyword approach is employed to invoke the functionality. Other suitable state transitions are possible.

```
void CompleteAsynchronousOperationWrapper(string id,
string customData)
{
    // Some information may be implicit here, that is,
    the called API
    // may compute/retrieve/broadcast default
    information such as
    // current thread id, stack location, file and line
    details, etc.
    BroadcastTransition(STATE_INITIATE, id, customData
    /*, ... */);
    try
    {
        CompleteAsynchronousOperation( );
    }
    catch (Exception)
    {
        BroadcastTransition(STATE_EXCEPTION_OCCURRED,
        id, customData /*, ... */);
    }
    finally
    {
        BroadcastTransition(STATE_COMPLETED, id,
        customData /*, ... */);
    }
}
```

Other issues can result from applications that connect to one or more back end services. When reviewing the telemetry logs collected from both client applications and servers, the end-to-end causality of an operation and how the client steps related to the server steps can be understood. The code example below is based around the use of XHR and is used to provide information in order to manage an execution graph. The APIs demonstrate providing identifiers to permit chaining together nodes in the operation. In this example, the API names represent an operation identifier, e.g., 'creation', 'completion'. When called, the APIs have access to stack location information that can also be recorded. The statements in the example description that mention these API are made explicit for illustrative purposes and, in another example, would likely be pushed into the runtime/ framework API. Although the API is exposed directly in the example, other examples are contemplated.

```
var requestId = 0;
function OnButtonClick(evt) {
    var causality =
Windows.Foundation.Diagnostics.Causality;
    var id = requestId++;
    causality.traceAsyncOperationCreation(
        causality.Necessary,
        causality.Application,
        id,
        "{BFF199C5-9919-43EE-A7DA-547692F221EB}");
    WinJS.xhr({
        url: "http://myservicebackend.com/SomeOperation",
        headers: { requestId: id }
    }).done(function(request) {
        causality.traceSynchronousWorkStart(
            causality.Important,
            causality.Application,
            id,
            "{BFF199C5-9919-43EE-A7DA-547692F221EB}",
            causality.Complete);
        //process server response
        causality.traceSynchronousWorkCompletion(
            causality.Important,
            causality.Application);
    };
}
```

Diagnostic information can be output in a number of ways. One example involves an output of diagnostic information from a process of getting a file from a folder, opening a file, and reading from a stream, which are all asynchronous operations. The logic includes downloading RSS feeds with the WinRT SyndicationClient class, reading and writing local files with the WinRT Storage classes and accessing back end of the application via XHR (not shown). The following table illustrates an example diagnostics output that a developer might consult at a breakpoint.

| Name | Language |
| --- | --- |
| Anonymous function [default.js] Line 30 | Script |
| notifySuccess [Function code] line 76 | Script |
| doNotify [Function code] line 134 | Script |
| doComplete [Function code] line 32 | Script |
| completed [Function code] line 289 | Script |
| IInputStream.ReadAsync | Native |
| Anonymous function [default.js] Line 20 | Script |
| notifySuccess [Function code] line 76 | Script |
| doNotify [Function code] line 134 | Script |
| doComplete [Function code] line 32 | Script |
| completed [Function code] line 289 | Script |
| StorageFile.OpenAsync | Native |
| Anonymous function [default.js] Line 10 | Script |
| notifySuccess [Function code] line 76 | Script |
| doNotify [Function code] line 134 | Script |
| doComplete [Function code] line 32 | Script |
| completed [Function code] line 289 | Script |
| StorageFolder.GetFileAsync | Native |
| process_file [default.js] Line 17 | Script |
| fileProcessButton click event | Native |

The first five frames are on the stack. The remaining chain frames were logged as they were executed so that the full chain could be displayed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computing device implemented method for diagnosing computer readable instructions, the method comprising:
    logging a state transition of a unit of execution within a logical operation providing an event handler for a Document Object Model during runtime of an object of the computer readable instructions into an instance of the object;
    associating diagnostic information regarding runtime origin of a later-manifested runtime artifact of the logical operation of an event handler of the Document Object Model with the state transition; and
    providing the state transition and associated diagnostic information for retrieval at a selected point in the computer readable instructions for the element of the Document Object Model in an incorrect state.

2. The method of claim 1 wherein the logging comprises logging into a data structure.

3. The method of claim 1 wherein the logging comprises broadcasting the state transition by publishing events or invoking callbacks registered for notification.

4. The method of claim 3 wherein the broadcasting the state transition occurs in response to receiving metadata associated with a code location that indicates the information should be broadcast.

5. The method of claim 1 wherein the logging comprises annotating runtime objects with state transition information.

6. The method of claim 1 comprising adding state transition information to a constructed object or instantiated code.

7. The method of claim 1 wherein the state transition comprises initiating a unit of execution.

8. The method of claim 7 wherein the diagnostic information comprises an identifier to identify the logical operation during lifetime of the logical operation.

9. The method of claim 1 wherein the diagnostic information comprises a call stack corresponding with the state transition.

10. A system to diagnose computer readable instructions, the system comprising:
    memory to store a set of instructions; and
    a processor to execute the set of instructions to:
    retrieve diagnostic information regarding runtime origin of a later-manifested runtime artifact of a logical operation providing an event handler for a Document Object Model in an incorrect state at a selected point in the computer readable instructions, the diagnostic information being associated with a state transition of a unit of execution within a logical operation logged during the runtime of an object the computer readable instruction into an instance of the object via the exception handler of the Document Object Model.

11. The system of claim 10 wherein the instructions to retrieve diagnostic information comprises instructions to retrieve the diagnostic information associated with the state transition from a memory.

12. The system of claim 10 wherein the instructions to retrieve diagnostic information comprises instructions to retrieve the diagnostic information associated with the state transition while executing the computer readable instructions.

13. The system of claim 10 wherein the instructions to retrieve diagnostic information comprises instructions to retrieve the diagnostic information associated with the state transition in response to execution of the computer readable instructions being halted.

14. The system of claim 13 wherein the execution is halted as a result of an exception.

15. The system of claim 10 wherein the instructions to retrieved diagnostic information associated with the state transition describes a code location of a construct.

16. The system of claim 10 wherein the instructions to retrieved diagnostic information associated with the state transition comprises data of a call stack.

17. The system of claim 16 wherein the data of the call stack is included in a crash dump.

18. A computer readable storage device to store computer executable instructions to control a processor, the instructions comprising instructions to:
    log a state transition of a unit of execution within a logical operation providing an event handler for a Document Object Model during runtime of an object of the computer readable instructions into an instance of the object;
    associate diagnostic information regarding runtime origin of a later-manifested runtime artifact of the logical operation of an event handler of the Document Object Model with the state transition; and
    provide the state transition and associated diagnostic information for retrieval at a selected point in the computer readable instructions for the element of the Document Object Model in an incorrect state.

19. The computer readable storage device of claim 18 including instructions to generate an implied code at compile time and emitting to an assembly at runtime.

20. The computer readable storage device of claim 18 wherein the event handler is provided on a thread of a plurality of threads during runtime and including instructions to filter the plurality of threads to discover the thread.

* * * * *